(12) United States Patent
Diederich

(10) Patent No.: US 6,170,639 B1
(45) Date of Patent: Jan. 9, 2001

(54) APPARATUS FOR CARRYING OUT A SEQUENCE OF SUCCESSIVE OPERATIONS ON SMALL WORKPIECES

(75) Inventor: Otto Diederich, Heiligenstadt (DE)

(73) Assignee: Sim Automation GmbH & Co. KG, Heiligenstadt (DE)

(*) Notice: Under 35 U.S.C. 154(b), the term of this patent shall be extended for 0 days.

(21) Appl. No.: 09/300,266

(22) Filed: Apr. 27, 1999

(30) Foreign Application Priority Data

Jun. 17, 1998 (DE) .............................. 198 26 627

(51) Int. Cl.⁷ ................................................. B65G 47/31
(52) U.S. Cl. ................................ 198/461.2; 198/461.3; 198/459.6; 198/832.1; 198/834; 198/836.1; 198/419.2
(58) Field of Search .......................... 198/339.1, 345.3, 198/461.2, 461.3, 459.1, 459.6, 832.1, 834, 836.1, 836.3, 419.2, 419.3, 419.1

(56) References Cited

U.S. PATENT DOCUMENTS

| | | | | |
|---|---|---|---|---|
| 3,812,947 | * | 5/1974 | Nygaard | 198/19 |
| 4,069,764 | * | 1/1978 | Teyssedre | 198/344 |
| 4,355,712 | * | 10/1982 | Bruno | 198/460 |
| 5,038,915 | * | 8/1991 | Delsanto | 198/419.3 |

* cited by examiner

Primary Examiner—Jospeh E. Valenza
Assistant Examiner—Khoi H. Tran
(74) Attorney, Agent, or Firm—Herbert Dubno

(57) ABSTRACT

An apparatus for performing a variety of fast and slow operations including mounting operations upon workpieces affixed to workpiece carriers in which the slow operations are carried out at one station and the fast operations are carried out at another. The linear transfer device of the fast station operates at a stroke rate which is greater by a whole number than the stroke rate at the slow operation station, the workpiece carriers are fed in groups equal to this whole number to the slow operation units simultaneously and the slow operation units perform the same slow operation at each of a number of these units equal to that whole number.

18 Claims, 5 Drawing Sheets

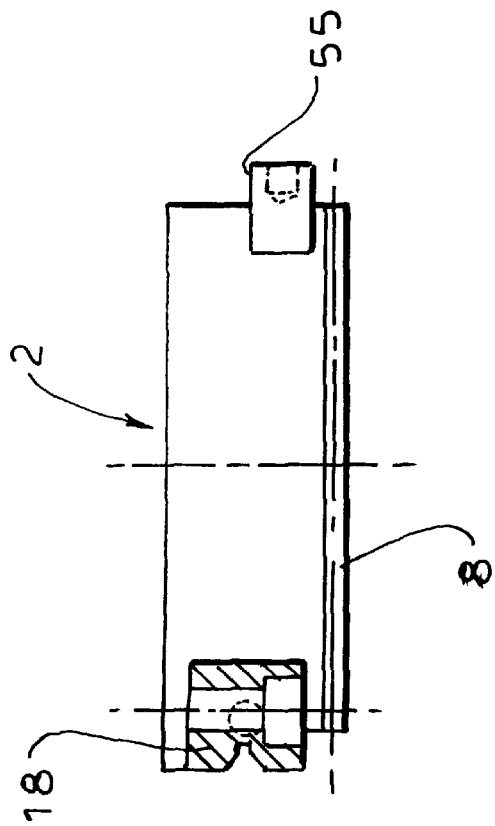
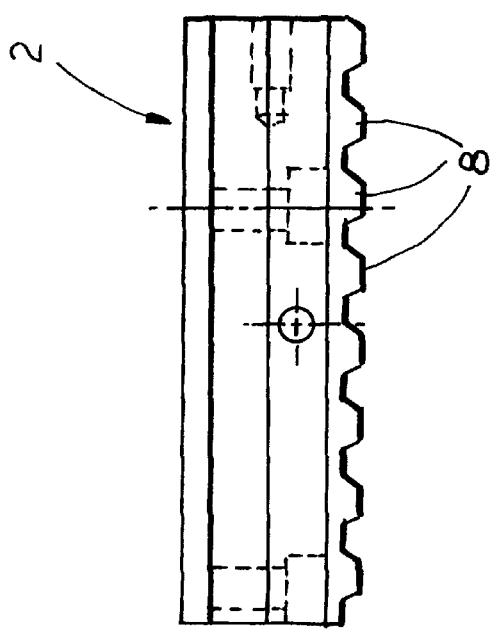
FIG. 5b
FIG. 5a

APPARATUS FOR CARRYING OUT A SEQUENCE OF SUCCESSIVE OPERATIONS ON SMALL WORKPIECES

FIELD OF THE INVENTION

My present invention relates to an apparatus for performing a sequence of mounting and/or machining operations on workpieces, especially small workpieces, wherein the workpieces have been mounted on respective workpiece carriers and the apparatus includes at least two work stations disposed one behind the other along a path of the workpiece carriers. More particularly, the invention relates to an apparatus of this kind in which the working stations provide mounting and machining operations in conjunction with a linear transfer and a stepwise movement and wherein the working stroke of the operating stations are coordinated with the stepwise movement of the workpieces. Apparatus of this type can be widely used for mounting and finishing operations of components made from a multiplicity of prefabricated parts, for example, electric plugs or jacks, couplings with the previously inserted seal, automotive accessories and the like.

BACKGROUND OF THE INVENTION

Working stations at which mounting and/or machining operations are carried out with coordination between those operations and a feed movement of the workpieces in a stepwise manner, can utilize workpiece carriers and linear transporters for these workpiece carriers in accordance with DE A 43 20 501 and DE A 196 03 253. In these systems all of the working stations have essentially the same stroke independently of whether the particular operation practiced at the station is a fast operation, for example, a stamping or punching operation for producing plug components, or a slow operation, for example, gluing or soldering of a component in place. In order to increase output, the mounting and/or working operations for a slower process can be carried out in parallel to one another, but this complicates the travel of the workpieces and requires that the workpieces be shifted out of sequence into parallel paths and subsequently returned to the processing line. The need for diverting paths of workpieces and combining the paths of workpieces, complicates the travel and itself has a tendency to limit the productivity of the apparatus.

OBJECTS OF THE INVENTION

It is, therefore, the principal object of the present invention to provide an apparatus of the type described which permits higher outputs to be achieved without drawbacks of the kind one would expect from a line operating in a hybrid sense with both fast processes and slow processes.

More specifically it is an object of the invention to provide an apparatus for the processing of workpieces in which both fast and slow processing can occur but which does not require branching of the workpiece path or a rejoining of the workpiece path after such branching.

Still another object of the invention is to provide an apparatus for carrying out a succession of procedures on workpieces, especially small workpieces of a type which must be mounted on workpiece carriers, whereby drawbacks of earlier systems are avoided.

SUMMARY OF THE INVENTION

These objects and others which will become apparent hereinafter are attained, in accordance with the invention, in an apparatus wherein the mounting/operating devices for the rapid procedures are carried out at a first work station I and the latter is operated at a rapid feed stroke with a high feed number $N_V$ per unit time. The mounting/operating devices for the slower processes are provided at least at one second work station II and with a stroke or cycling rate such that the workpiece number processed $N_A$ per unit time is smaller by a whole number divisor i than the feed stroke $N_V$ ($N_V$=i·$N_A$). In the second work station II, for the same operation there is provided a plurality of mounting and processing devices $MII_1 \ldots MII_i$ arranged one after another in the longitudinal direction of a transfer device and in a number $n_{II}$ which corresponds to the quotient i formed by the feed stroke $N_V$ faster process and the stroke rate $N_A$ for the slower processes carried out in the second work station ($i=N_V/N_A$). Furthermore, the transfer device used in the second work station II encompasses a number of prepositioned workpiece carriers that also corresponds to the quotient of the feed stroke coefficient $N_V$ and the working stroke coefficient $N_A$ and a corresponding number $n_{II}$ of mounting stroke processing devices $MII_1, \ldots MII_i$ is supplied with the workpieces simultaneously with a given stroke.

It will be apparent that further working stations can be incorporated in the processing line without branching when similar stations are provided to the second work station and are operated in the same relationship to the feed stroke of the first station wherein, of course, the most rapid processing takes place. The processing can be carried out without limitation of the throughput since the number of units processed at each of the stations remains the same with all of the mounting and operating units in each station operating simultaneously.

The transfer device is so operated that all of the mounting and operating units $MII_1 \ldots MII_i$ of each slower station are simultaneously or approximately simultaneously supplied with respective workpiece carriers in a single operating cycle or stroke.

Positioning can be effected by a carrying out of two or optionally more transport steps of equal length before startup of the entire apparatus whereby the workpiece carriers can be distributed to the mounting and operating devices $MII_1, MII_2 \ldots MII_i$ before the strokes described previously. According to a feature of the invention the transfer device for the second work station includes a feeder for workpiece carriers which is capable of prepositioning the workpiece carriers at spacings of the mounting/operating devices. In this arrangement according to the invention, a plurality or larger number of workpiece carriers may be simultaneously engaged by the transfer device and advanced in a single step to the corresponding number $n_{II}$ of mounting/operating devices.

The transfer means can be so configured that the workpiece carriers with workpieces already mounted thereon are provided ahead of the respective mounting and processing units so that, after traversing the work station, the workpiece carrier with the workpieces mounted thereon can be fed to the next work station. At each station, the insertion of the workpiece carrier at each work station must be such that the inserted workpiece carrier is exactly positioned at a predetermined time at the mounting/operating device therefor. The permissible tolerances are small. The transfer devices described subsequently satisfy these requirements.

Preferred transfer devices according to the invention include feeders for the workpiece carriers and an intermittently driven belt transmission with at least one cog belt which has matching profiles to the tooth profile of the workpiece carrier along a bottom side thereof. A coupling section of the belt is arranged to be raised and lowered so that the coupling section in a lifting action can engage in the teeth of the workpiece carrier which has been prepositioned on the feed unit.

Advantageously the coupling section of the transfer device of the second work station is so dimensioned that with a single stroke a number of workpiece carriers prepositioned on the feed unit, corresponding to the quotient i of the feed stroke coefficient $N_V$ and the working stroke coefficient $N_A$ are simultaneously engaged.

According to a preferred embodiment of the invention, the transfer unit has guide rails along which the workpiece carriers engaged by the belt drive are laterally guided. One guide bar forms a precision rail or stop for the precise orientation of the workpiece carrier to the mounting and operating unit to satisfy the narrow range of machining tolerances.

Furthermore, a clamping device with a clamping element is provided which can engage the workpiece carrier in the working direction and can fix it at a precision abutment. Preferably the clamping element and workpiece carrier have mutually-engaging centering surfaces. The centering is effected between the clamping element and the workpiece carrier and between the precision abutment and a complementary abutment surface of the workpiece carrier to enable precise machining and mounting of the workpiece resting on the workpiece carrier.

According to another feature of the invention, the belt drive of the transfer device has two parallel cog belts for a transport of the workpiece carrier and a coupling cog belt movable synchronously thereto with the coupling cog belt located between the parallel tooth belts and which is capable of carrying out a vertical coupling movement.

The parallel belts, which serve for horizontal transport of the workpiece carrier, and the coupling cog belt are mechanically connected with one another so that a synchronous movement is ensured.

It has been found further that the belt drive has a drive wheel in addition to two deflecting wheels and the parallel cog belts for the transport of the workpiece carriers are guided around the drive wheel and then pass in common with the coupling wheel over the deflecting wheel. The coupling cog belt is guided over the two deflecting rollers.

Furthermore, in another configuration, the coupling cog belt is provided in an upper stretch and the belt drive is provided in a lower stretch of the belt drive and is guided via a shoe which is connected to the positioning device effecting the vertical coupling movement.

It will be self-understood that the coupling cog belt length is so dimensioned with respect to the belt lengths that the shoe can undergo the requisite displacement. A displacement in the range of at least 10 mm to several centimeters, is sufficient. The described embodiment ensures that for the setting only a relatively small mass must be moved.

Another arrangement within the invention provides a wheel over which the coupling cog belt is looped and which is connected to provide the displacement required by the setting.

BRIEF DESCRIPTION OF THE DRAWING

The above and other objects, features, and advantages will become more readily apparent from the following description, reference being made to the accompanying drawing in which:

FIG. 5a and 5b show respectively a side view and a section of workpiece carriers according to the invention; and FIG. 6 is a detail of the region VI of FIG. 2.

SPECIFIC DESCRIPTION

The workpieces 1 are mounted upon workpiece carriers 2 and traverse the system of the invention from left to right, i.e. in the travel direction represented by the arrow A, passing through a sequence of mounting and/or operating stations or subjected to a sequence of mounting and operating processes. Typical of the mounting and operating processes are those used when the apparatus is to mount prefabricated individual components, usually stamped out or punched out parts, seals, screws, bolts, nuts or even electronic components or the like on a support plate which can be represented by the workpiece 1 and can be held on the workpiece carrier 2 in appropriate orientation for these operations. Such components or elements can be positioned on and affixed to the support plate, e.g. a printed circuit board and, as a rule, the operations will include rapid operations, i.e. those which are quickly performed and require rapid acting devices like rivetting, punching, stamping and the like.

The slower operations which are to be practiced at respective stations can be operations like adhesive bonding, soldering and the like.

Figure 1:
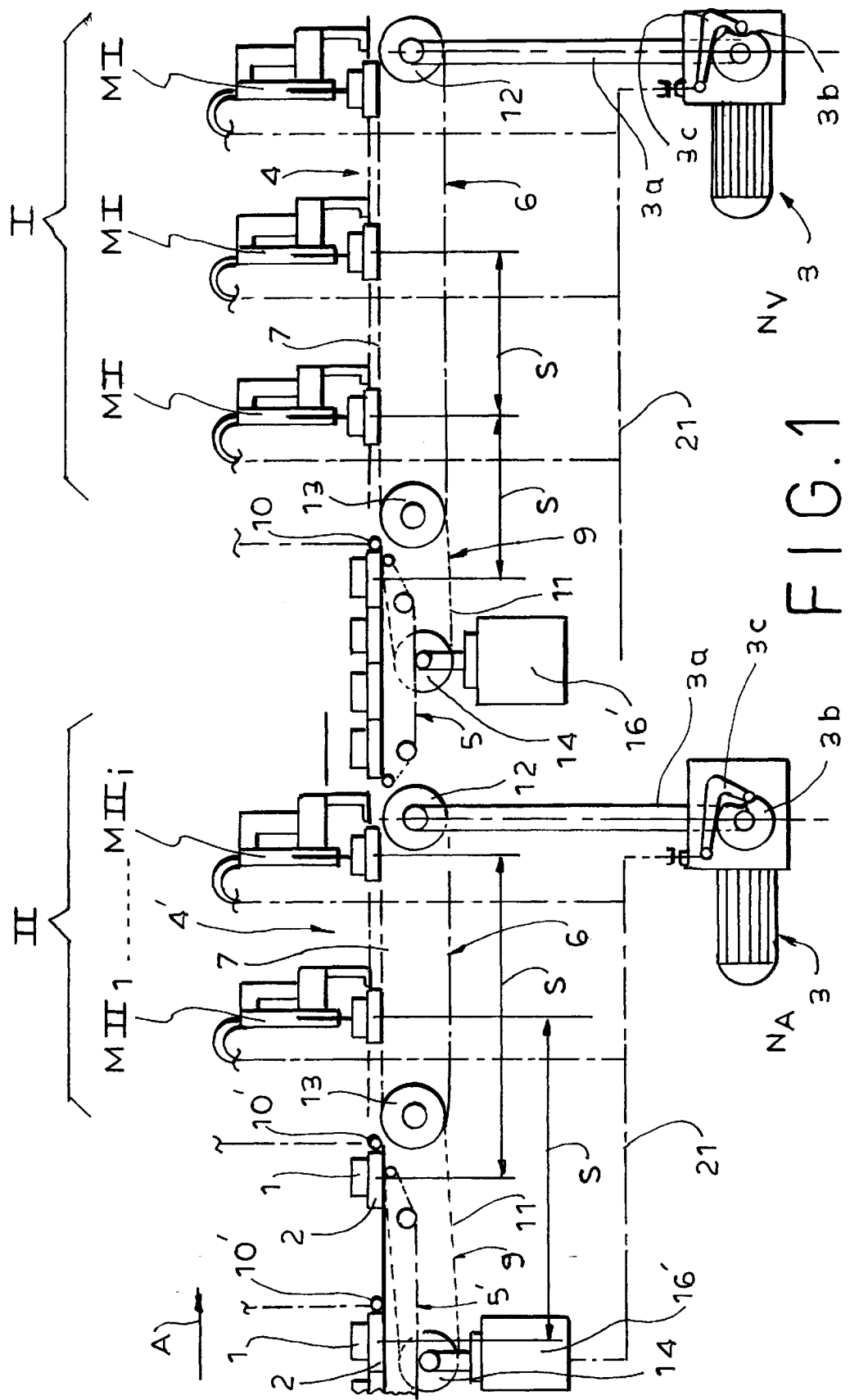
FIG. 1 is a side elevational view of an apparatus for carrying out a sequence of mounting and processing operations on a succession of workpieces.

The apparatus shown in FIG. 1 is comprised of at least two successive groups of work stations I and II which are located in the travel direction A, one after the other and which are provided with mounting and operating units MI and MII, respectively. The operating regions I and II referred to generally as work stations heretofore and hereafter, each comprise a respective drive 3 for the forced advance of the workpieces through the respective station in a cyclical fashion, i.e. at a certain stroke rate, each cycle representing an interval during which the workpiece is advanced and an interval at which the workpiece is at standstill, e.g. for the respective operations at the units MI and MII respectively.

The drives, which can be conveyers 6 are provided with rollers 12, 13 driven by respective motors 3 via transmissions 3a. Each work station I and II has therefore a linear transfer unit 4, 4' for stepping the workpiece carriers 4 through the respective mounting and operating units at a rate matched to the requirements of those units. For example, the mounting and operating units MI for the rapid procedures are collected in the first work station I and have a linear transporter with a rapid cycling time and thus a high number of advanced cycles $N_V$ per unit time. The linear transporter 4' for the units MII of the second work station which cycle more slowly themselves, has a slower cycle time and a number of advanced cycles $N_A$ per unit time which is smaller by a whole number i than the cycle rate $N_V$. This is represented by the mathematical expression $$N_V = i \times N_A$$

i=2, 3 ... n.

In the work station I in which the rapid-action processing units MI are grouped, the units MI can carry out different relatively rapid operations. By contrast in the work station II in which the slower operations are intended to be carried out, each group of operating devices $MII_1 \ldots MII_i$ in the longitudinal direction along the transfer unit 4' carry out the same processing operation, i.e. either the same adhesive bonding step or the same soldering step. The number of units practicing the same operating step in stations II, i.e. $n_{II}$ is equal to the quotient i of the feed cycle rate $N_V$ and the cycle rate $N_A$ previously mentioned. If the mounting and operating units MI of the first station I operate at 100 cycles/strokes per minute, the operating station II for the slower procedures can operate at 50 cycles/strokes per minute and thus for each process practiced in the second station II there will be two mounting/operating units $MII_1$, $MII_2$ in series, one behind the other for carrying out each operation.

In the work station I in which the rapid operations are performed, the workpiece carriers are moved with a per-stroke length s corresponding to the distance between two successive operating units MI and corresponding of course to the separation of the workpiece carriers on the transfer unit 4.

In the second work station II, in which the slower processes are carried out, the stroke length S is greater and hence the workpieces are prepositioned on the transfer unit 4' at the spacing s although that transfer unit operates with the greater stroke S. This is shown in FIG. 1 for a system where i=2 and two workpiece carriers are operated upon in station 2 simultaneously for the longer duration required and simultaneously perform the same operation on two successive workpieces.

The transfer unit 4' of the second work station II has, upstream thereof, a feeder 5 for the workpiece carriers 2 which ensure the proper spacing of these workpiece carriers on the linear transfer unit 4'. The workpiece carriers can be practically in contact with one another, i.e. abut one another before they are advanced to the linear transporter 4' and can be collected on a conveyor 5 practically in mutually abutting relationship before they are fed with the proper spacing to the linear transport 4 previously described. In any event, two or more workpiece carriers whose number $n_{II}$ is calculated as has been described are simultaneously advanced by the transport device 4' and are displaced with the larger step S through the station II where they are processed for the greater standstill time at the slower operating units $MII_1 \ldots MII_i$.

Thus the working stations I and II are associated with linear transfer units 4, 4', each of which has a respective feeder 5, 5' for properly spacing the workpiece carriers 2 thereon and an intermittently driven conveyor belt system 6 whose belt 7 can be cogged belts which have, as can be seen in FIG. 6, internal and external cogs. The external cogs help engage and position the carriers 3 which may have teeth on their respective bases engaging the external teeth of the belt 7. The internal teeth of the cog belt 7 mesh with the teeth of the rollers 12 and 13 on which the belt 7 is supported.

The coupling section 9 of the conveyor belt 6 can be raised and lowered to enable the teeth at the bottom of the workpiece carriers 2 to engage in the teeth on the upper side of the belt 7. The coupling section of the transfer unit associated with work station I is so dimensioned that with each vertical stroke a workpiece carrier 2 at the gate or stop 11 is lifted sufficiently to allow the teeth on the underside of the carrier to engage the cogs of belt 7, whereupon the gate 10 is lifted. The vertical displacement can be produced by a cam 3b driven by the motor 3 via cam follower 3c which can be coupled as shown at 21 to the lifter 16, 16' and to the gate 10 if desired.

The coupling section 9 of the belt 6 of the second work station II (transfer unit 4') is so dimensioned that with a single stroke and with a quotient i of the feed cycle rate or coefficient $N_V$ and the working cycle rate $N_A$, a corresponding number of prepositioned work carriers is engaged and transferred to the unit 4'. The lifting movement here can also be effected by a cam 3b, a cam follower 3c and a coupling system 21 to the lifting unit 16' for the belt sprocket 14 over which the belt 9 passes.

Further details of the transfer units 4 and 4' will be apparent from FIGS. 2–4 and 6. In the embodiment illustrated and in a preferred embodiment of the invention, the belt conveyor 6 of the transfer unit comprises two parallel cog belts 7 for carrying and displacing the workpiece carriers, these belts being illustrated in dot-dash lines in FIG. 3. They cooperate with a coupling cog belt 11 movable synchronously with the belts 7 and forming the elevatable conveyor system 9. The cog belt 11 passes around the pulley or sprocket wheels 13 and 14 which have been shown in side elevation in FIG. 2 and are visible from above in FIG. 3.

The upper pass of the belts 7, forming the upper pass of the conveyor 6, rides above the sliding surface 50 of a machine frame 51. The coupling belt is located between the parallel belts 7 and generates a vertical coupling movement. The coupling belts 11 and the belts 7 are mechanically interconnected, e.g. via the cog pulley 13 over which the belts 7 pass to return to the cog wheel 12 and over which the cog belt 11 passes to return to the cog wheel 14.

The drive for the conveyor 6 is effected through the driving cog wheel 12, the cog wheels 13 and 14 being deflecting cog wheels or idlers. The parallel cog belts 7, therefore, pass around the drive cog wheel 12 and drive, in turn, the cog wheel 13 which entrains the cog belt 11 which, in turn, passes around the cog wheel 14. The coupling cog belt 11, therefore, passes around the two cog belts 13 and 14.

Figure 2:
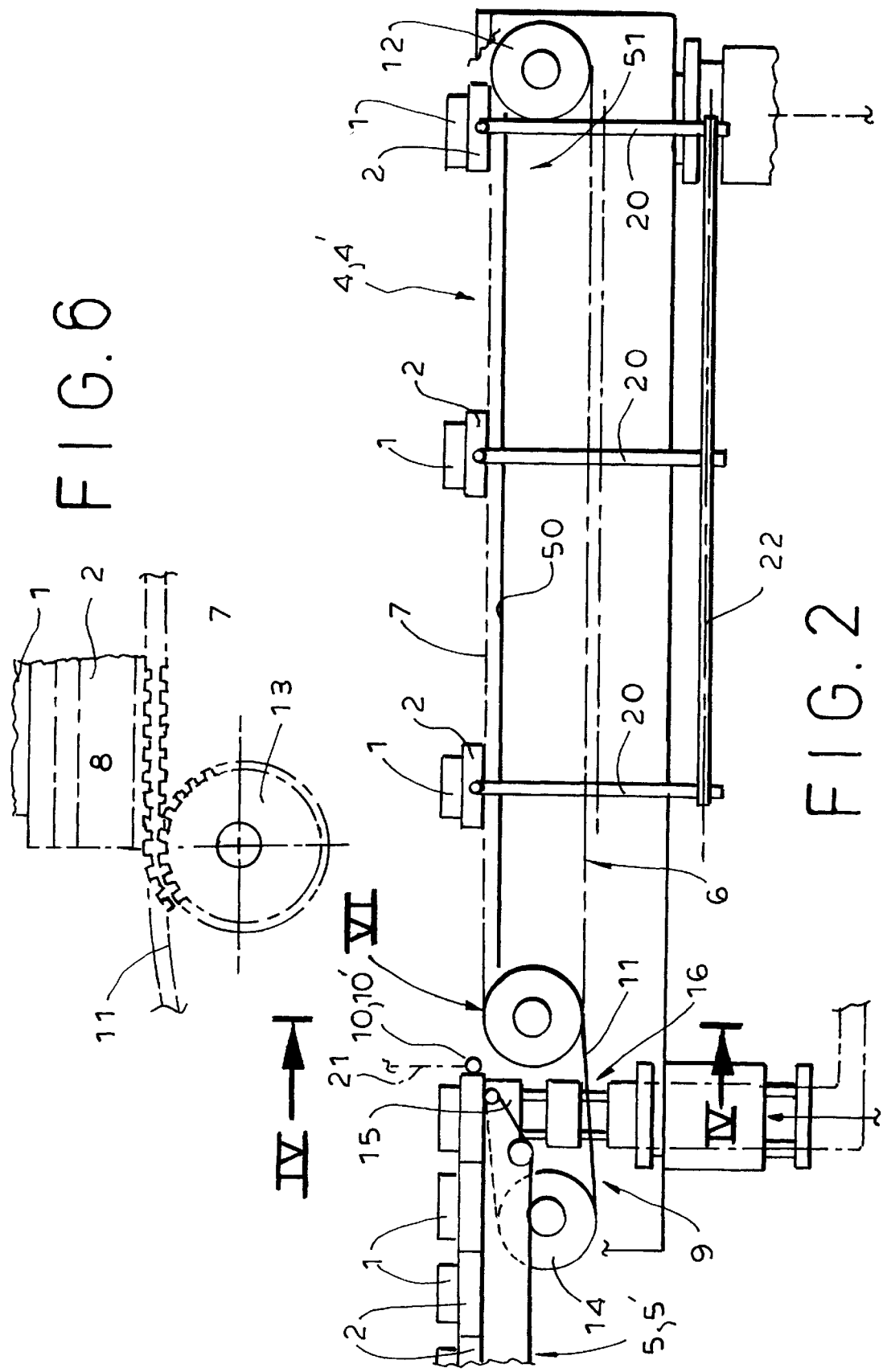
FIG. 2 is a view drawn to a larger scale of the linear transfer device provided in FIG. 1.
Figure 3:
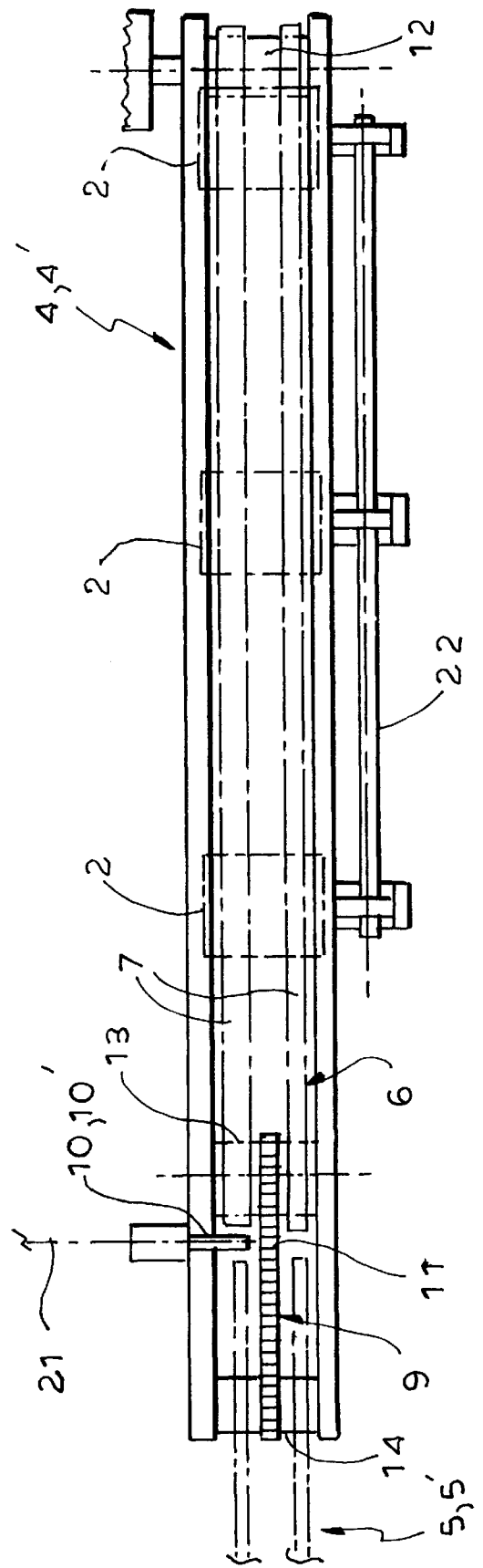
FIG. 3 is a plan view of the transfer device shown in FIG. 2.

As is also apparent from FIG. 2, the cog belt 11 is guided in its upper pass as well as in its lower pass on a shoe 15 which is connected to the vertical displacement unit 16. This effector can be a cylinder, e.g. a hydraulic or pneumatic cylinder connected by a valve to the actuator line 21, or can be a mechanical coupling to the cam follower 3c previously described. As has been shown in FIG. 1, the vertical actuator, rather than acting upon a shoe or the like as in the preferred embodiment of FIGS. 2–4, can act on the idler wheel 14 (see FIG. 1).

Figure 4:
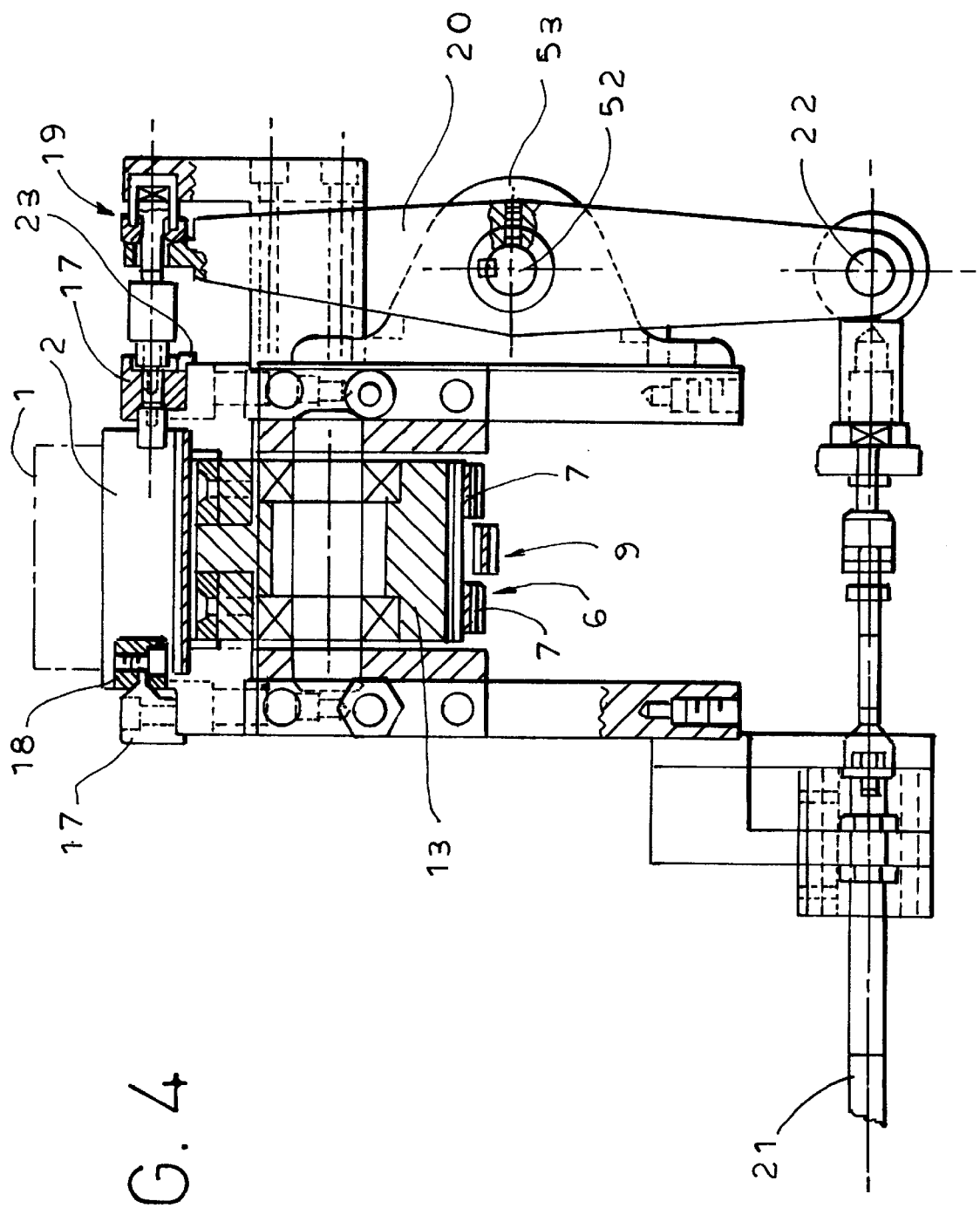
FIG. 4 is a section along the line IV—IV of FIG. 1.

As is especially apparent from FIG. 4, the transfer units 4, 4' are provided between guide bars 17 at the lateral sides of the conveyor and which laterally engage, in turn, the workpiece carriers 2 displaced by the belts 7 one of the guide bars 17 is formed as a precision stop which is supported in the frame of the machine with accurate positioning, to precisely orient the workpiece supports 2 at the mounting and operating units MI, MII while the other bar can press against the workpiece carrier and urge it toward the bar 17 acting as the precision stop.

The workpiece carriers can be formed as molded synthetic resin articles and they can be equipped at the side turned toward the precision stop, with a metal bar 18 which can ride on the metal bar, the tolerances of these bars being such that the workpiece 1 is located at each work station at the requisite orientation for the operation. On the other side the workpiece carrier 2 is juxtaposed with a clamping unit 19 which has a bell crank lever 20 swingable on a shaft 52 journaled by a block 53 to the housing 51. The drive 3 can, via the coupling 21, here shown as a bushing or pulling actuating element be coupled by a rod 22 to one end of the lever 20 whose other end can bear via the pin 23 on the workpiece carrier 2, the pin being displaceable in the other guide bar 17. The levers 20 at each of the stop positions of the workpiece are actuated in common (see FIGS. 2 and 3) via the rod 22 so that the clamping operations are synchronized as well.

Thus, in each cycle, not only does the drive 3 release the workpiece carriers 2 so that they can move and drive the conveyors 6 to advance the workpieces, but it also locks the workpieces in position for the various operations during standstill of the conveyors 6. The clamping plunger 23 can coact with the workpiece carriers 2 via self-centering surfaces for accurate positioning of the workpiece carrier.

On their undersides, the workpiece carriers 2 are provided with cogged profiles 8 (FIGS. 5a and 5b) to facilitate interdigitation with the upper cogs of the belts 11 and 7. The bar 18 is shown to be set into the plastic body forming the workpiece carrier 2 and on the opposite side of the workpiece carrier is a centering bushing 55 which coacts with the pin 23.

I claim:

1. An apparatus for carrying out slow operations and fast operations upon workpieces along a manufacturing line, said apparatus comprising:
    at least one slow operation station having a plurality of operating units, and at least one fast operation station having a plurality of operating units, said stations being spaced apart along said line;
    a first intermittent linear transfer device at said fast-operation station operable at a cycling rate ($N_V$) per unit time for advancing workpieces on respective workpiece carriers to a first operating unit of said fast-operation station and from operating unit to operating unit of said fast-operation station along said line; and
    a second intermittent linear transfer device at said slow-operation station for simultaneously advancing a plurality of workpiece carriers to a corresponding number of said operating units of said slow operation station and operable at a cycling rate ($N_A$) per unit time, wherein ($N_A$) is smaller than ($N_V$) by a whole number multiple (i), the number ($n_H$) of said operating units to which said workpiece holders and respective workpieces are fed simultaneously in said slow-operation station corresponding to the quotient (i) of the cycling rate ($N_V$) and the cycling rate ($N_A$), the operating units of the slow-operation station to which said workpiece carriers and workpieces are simultaneously fed being equal in number to said quotient and performing the same task.

2. The apparatus defined in claim 1 wherein said second intermittent linear transfer device includes a feeder for supplying said workpiece carriers with workpieces thereon in groups equal in number to said quotient to said second intermittent linear transfer device and prepositioned at a spacing equal to a spacing of the operating units of the slow-operation station performing the same task at each single step of advance of said second intermittent linear transfer device.

3. The apparatus defined in claim 2 wherein each of said linear transfer devices includes at least one cog belt, an intermittent drive for said cog belt, a coupling conveyor section at an upstream side of said cog belt which can be raised and lowered to deposit said workpiece carriers on the respective cog belt, said carriers having teeth on their undersides interdigitating with cogs of said cog belts.

4. The apparatus defined in claim 3 wherein said coupling conveyor section of the second intermittent linear transfer device is constructed and arranged to deposit in a single lifting stroke thereof a number of workpiece carriers equal to said quotient onto said second intermittent linear transfer device for each single stroke thereof.

5. The apparatus defined in claim 3, further comprising a pair of guide bars flanking said cog belt and including a precision bar along one side of said workpiece carriers for engagement therewith to accurately position said workpiece carriers laterally, and clamping devices engageable with said workpiece carriers from opposite sides thereof for locking each workpiece carrier in position at each of the operating units of at least one of said fast and slow stations.

6. The apparatus defined in claim 3 wherein each of said intermittent linear transfer devices includes a pair of parallel cog conveyor belts, and a coupling cog belt between the cog conveyor belts of the respective transfer device, each of said coupling belts being raisable and lowerable to deposit respective workpiece carriers on the conveyor belts so that teeth on the undersides of said workpiece carriers engage in cogs of the conveyor belts.

7. The apparatus defined in claim 6 wherein at each of said devices, the conveyor belts pass around cog rollers which are engaged by the respective coupling belt.

8. The apparatus defined in claim 7 wherein each of said devices includes a driven cog roller engaged by said conveyor belts of the respective device remote from the respective coupling belt.

9. The apparatus defined in claim 7 wherein each coupling belt has upper and lower passes riding on respective shoes, further comprising means for imparting vertical movement to said shoes.

10. The apparatus defined in claim 7 wherein said coupling belt passes around a wheel remote from the respective conveyor belts, said wheel being provided with a device for raising and lowering same.

11. The apparatus defined in claim 1 wherein each of said linear transfer devices includes at least one cog belt, an intermittent drive for said cog belt, a coupling conveyor section at an upstream side of said cog belt which can be raised and lowered to deposit said workpiece carriers on the respective cog belt, said carriers having teeth on their undersides interdigitating with cogs of said cog belts.

12. The apparatus defined in claim 11 wherein said coupling conveyor section of the second intermittent linear transfer device is constructed and arranged to deposit in a single lifting stroke thereof a number of workpiece carriers equal to said quotient onto said second intermittent linear transfer device for each single stroke thereof.

13. The apparatus defined in claim 1, further comprising a pair of guide bars flanking said cog belt and including a precision bar along one side of said workpiece carriers for engagement therewith to accurately position said workpiece carriers laterally, and clamping devices engageable with said workpiece carriers from opposite sides thereof for locking each workpiece carrier in position at each of the operating units of at least one of said fast and slow stations.

14. The apparatus defined in claim 13 wherein each of said intermittent linear transfer devices includes a pair of parallel cog conveyor belts, and a coupling cog belt between the cog conveyor belts of the respective transfer device, each of said coupling belts being raisable and lowerable to deposit respective workpiece carriers on the conveyor belts so that teeth on the undersides of said workpiece carriers engage in cogs of the conveyor belts.

15. The apparatus defined in claim 14 wherein at each of said devices, the conveyor belts pass around cog rollers which are engaged by the respective coupling belt.

16. The apparatus defined in claim 15 wherein each of said devices includes a driven cog roller engaged by conveyor belts of the respective device remote from the respective coupling belt.

17. The apparatus defined in claim 15 wherein each coupling belt has upper and lower passes riding on respective shoes, further comprising means for imparting vertical movement to said shoes.

18. The apparatus defined in claim 15 wherein said coupling belt passes around a wheel remote from the respective conveyor belts, said wheel being provided with a device for raising and lowering same.

* * * * *